Sept. 9, 1969     E. G. FLESTER, JR., ET AL     3,465,781
FLUID AMPLIFIER COMPONENT ADJUSTABLE TO PROVIDE
A VARIETY OF CONFIGURATIONS
Filed June 15, 1967

INVENTORS,
EUGENE G. FLESTER
SILAS KATZ
BY Harry M. Saragovitz
Edward J. Kelly, Herbert Berl
& J. D. Edgerton – # United States Patent Office 3,465,781
Patented Sept. 9, 1969

3,465,781
FLUID AMPLIFIER COMPONENT ADJUSTABLE TO PROVIDE A VARIETY OF CONFIGURATIONS
Eugene G. Flester, Jr., Falls Church, Va., and Silas Katz, Silver Spring, Md., assignors to the United States of America as represented by the Secretary of the Army
Filed June 15, 1967, Ser. No. 646,805
Int. Cl. F15d 1/04; F15c 1/04
U.S. Cl. 137—271    3 Claims

ABSTRACT OF THE DISCLOSURE

A plurality of thin wire rods are enclosed in a split ring. The thin wire rods can be moved transversely to the split ring axis to simulate the geometry in a pure fluid amplifier without the necessity of going to the expense of building said pure fluid amplifier.

BACKGROUND OF THE INVENTION

This invention relates to the pure fluid arts and in particular to a device for allowing the rapid simulation of fluid flow in a pure fluid amplifier.

Pure fluid amplifiers have only been recently invented and rely on momentum interchange of two or more fluids to achieve a controlled fluid output without the use of moving parts. While flow in a pure fluid amplifier is easy to visualize it is extremely difficult to analyze mathematically. In the past fluid amplifiers were designed by cut and try methods. This involved the construction of a fluid amplifier by machining an amplifier configuration on a non-porous block and running tests thereon. This process was repeated until an amplifier was obtained which resulted in a desired flow characteristic. It is easy to see that designing a fluid amplifier by a cut and try method as described above is quite expensive and extremely time consuming.

It is therefore an object of the present invention to allow rapid and inexpensive simulation of flow in a fluid amplifier.

Another object of the present invention is to provide improved means to simulate flow in a fluid amplifier that will eliminate the cut and try methods used in the prior art.

SUMMARY OF THE INVENTION

Briefly, the present invention utilizes a large number of thin wires placed in a split ring. By elevating certain of the wires in the split ring and leaving the rest of the wires recessed, the geometry of a pure fluid amplifier may be duplicated allowing a simple simulation of flow in a pure fluid amplifier.

DESCRIPTION OF THE PREFERRED EMBODIMENT

Figure 1:
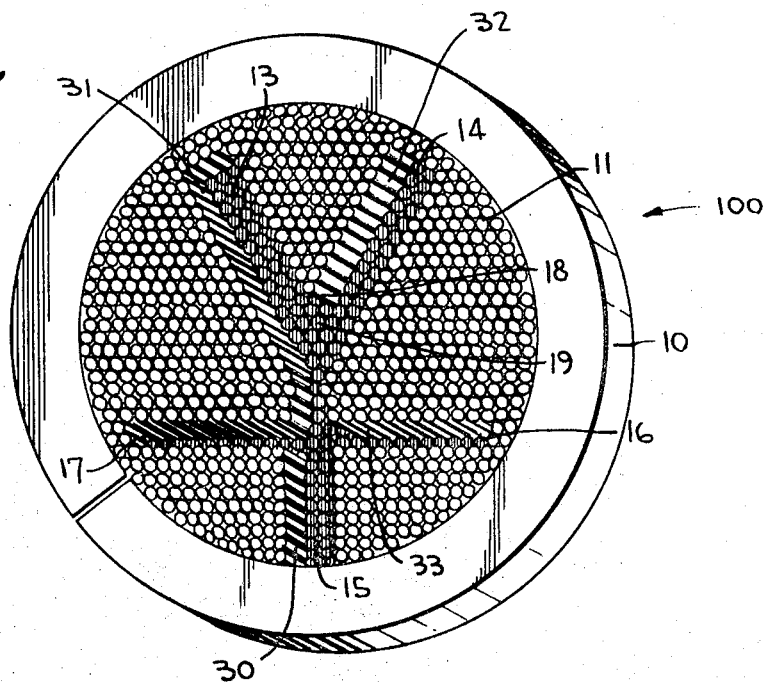
FIGURE 1 is a view of one side of an embodiment in accordance with the present invention, and,
FIGURE 2 is a view of the opposite side illustrated in FIGURE 1.
Figure 2:
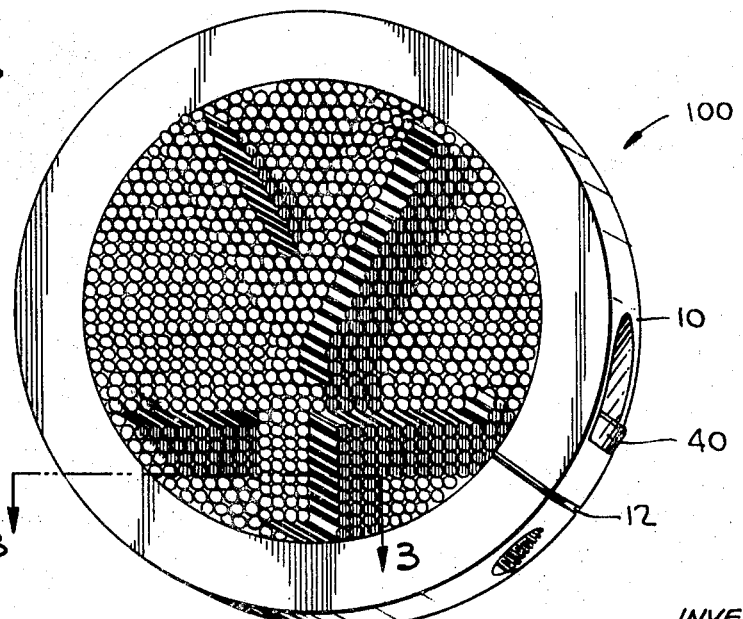
Figure 3:
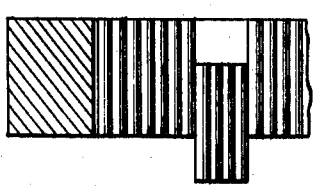
FIGURE 3 is a cutaway along line 3—3 of FIGURE 2.

FIGURE 1 a fluid amplifier simulator 100 is shown comprising a ring 10 having a split 12 (FIGURE 2) therein. Ring 10 is a thin walled cylindrical member and houses a plurality of thin solid rods 11. Rods 11 are placed inside ring 10 and have their axes parallel to the axis of ring 10. The rods are preferably about .010 inch or less in diameter and a sufficient number of rods are placed inside ring 10 to completely fill the area circumscribed by the ring. A nut 40 (FIGURE 2 on the circumference of ring 10 can be rotated to clamp rods 11 against each other or to provide a loose fit among the rods so they can be adjusted relative to each other.

As can be seen from FIGURE 1 certain of the rods have been depressed to simulate the geometry of a conventional bistable fluid amplifier. The depression at area 17 corresponds to the left control channel of a fluid amplifier while the depression at area 16 corresponds to the right control channel. The depression at area 15 corresponds to a control nozzle of a fluid amplifier with depressions 13 and 14 corresponding to the left and right output of a fluid amplifier respectively. Rods 18 correspond to the splitter of the amplifier with area 19 the interaction region of the amplifier.

After the desired configuration has been obtained by depressing the appropriate rods a non-porous material will be placed flat against the rods as is done with a conventional fluid amplifier. The non-porous material will have appropriate parts therein to communicate fluid to appropriate sections of the simulated amplifier and to remove fluid therefrom simulating flow in a fluid amplifier. While we have shown a classical bistable fluid amplifier simulated on our invention it is obvious that other fluid amplifier configurations could be simulated without departing from the scope or spirit of our invention.

We claim:
1. An adjustable fluid amplifier component, comprising:
  (a) a bundle of at least 50 thin wire rods parallel to each other and in close proximity to each other,
  (b) clamping means surrounding said bundle and holding said rods firmly clamped together,
  (c) each of said rods having a first end and a second end, all first ends facing in one direction and all second ends facing in the opposite direction,
  (d) the first ends of a majority of said rods lying in a first common plane substantially at right angles to the axes of said rods,
  (e) the first ends of a minority of said rods being selectively depressed a uniform distance from said first common plane to provide a depressed fluid amplifier pattern in a second common plane,
  (f) said bundle being adapted to be mounted with said first common plane in contact with a plate of nonporous material having input and output ports therein corresponding to said fluid amplifier pattern,
  (g) said clamping means being provided with adjustment means whereby the clamping action on said rods may be reduced to permit said fluid amplifier pattern to be varied by sliding said rods relative to each other.
2. The invention according to claim 1, said clamping means being a generally cylindrically shaped ring member holding said rods in a generally cylindrical bundle.
3. The invention according to claim 2 wherein said ring member has a split in its circumference and adjustable means for varying the width of said split.

References Cited
UNITED STATES PATENTS

| | | | |
|---|---|---|---|
| 2,947,320 | 8/1960 | Oxeley et al. | 137—271 |
| 3,283,767 | 11/1966 | Wright | 137—81.5 |
| 3,285,265 | 11/1966 | Boothe et al. | 137—81.5 |
| 3,294,103 | 12/1966 | Bowles | 137—81.5 |
| 3,314,294 | 4/1967 | Colston | 137—81.5 XR |
| 3,319,659 | 5/1967 | Bauet | 137—81.5 XR |
| 3,373,600 | 3/1968 | Taplin | 137—81.5 XR |
| 3,378,023 | 4/1968 | Beeken | 137—81.5 |

SAMUEL SCOTT, Primary Examiner

U.S. Cl. X.R.
137—81.5